United States Patent [19]

Schaetzler et al.

[11] Patent Number: 4,664,439

[45] Date of Patent: May 12, 1987

[54] SLIDING AND LIFTING ROOF FOR VEHICLES WITH A VERTICALLY ADJUSTABLE RAIN GUTTER

[75] Inventors: Walter Schaetzler, Stockdorf/Gauting; Werner Herlemann, Aidlingen; Horst Lux, Herrenberg; Hans Benda, Aidlingen, all of Fed. Rep. of Germany

[73] Assignees: Webasto-Werk W. Baier GmbH & Co.; Daimler-Benz Aktiengesellschaft, both of Fed. Rep. of Germany

[21] Appl. No.: 800,447

[22] Filed: Nov. 21, 1985

[30] Foreign Application Priority Data

Nov. 22, 1984 [DE] Fed. Rep. of Germany ....... 3442599

[51] Int. Cl.4 .......................... B62D 25/07; B60J 7/05
[52] U.S. Cl. .................................... 296/213; 296/221
[58] Field of Search ................. 296/213, 216, 221–223

[56] References Cited

U.S. PATENT DOCUMENTS

| 4,118,063 | 10/1978 | Bienert et al. | 296/213 |
| 4,417,763 | 11/1983 | Schlapp | 296/216 |
| 4,537,442 | 8/1985 | Jardin | 296/221 |
| 4,566,730 | 1/1986 | Knabe et al. | 296/221 |

FOREIGN PATENT DOCUMENTS 3444606 7/1985 Fed. Rep. of Germany ...... 296/221

Primary Examiner—Robert B. Reeves
Assistant Examiner—Dennis H. Pedder
Attorney, Agent, or Firm—Sixbey, Friedman & Leedom

[57] ABSTRACT

Sliding and lifting roof for vehicles, having a rigid cover which in its closed position covers a roof opening in a fixed roof surface. The cover is mounted on guide rails extending in a direction parallel to the side edges of the roof opening, and can be selectively tilted so as to lift its rear edge above the fixed roof surface, or rearwardly slidably displaced below the fixed roof surface, after lowering of its rear end below the fixed roof surface. A vertically adjustable rain gutter is provided which is elevated when the cover is in its tilted and close positions, which rain gutter underlies the rear edge of the roof opening and, upon lowering, can be rearwardly displaced together with the cover. The rain gutter is connected with a tilting device which, when the cover is raised, causes the rain gutter to assume an inclined position such that the forward edge of the rain gutter forms a splashboard which projects upwardly above the rear edge of the roof opening.

8 Claims, 5 Drawing Figures

SLIDING AND LIFTING ROOF FOR VEHICLES WITH A VERTICALLY ADJUSTABLE RAIN GUTTER

BACKGROUND AND SUMMARY OF THE INVENTION

The invention relates to a sliding and lifting roof for vehicles having a rigid cover, which in its closed position closes a roof opening in a fixed roof surface, which cover is mounted on guide rails that extend parallel to the side edges of the roof opening, and which cover can be selectively tilted so that its rear edge is raised above the fixed roof surface, or slidably displaced, after lowering of its rear end below the fixed roof surface. The invention also relates to a vertically adjustable rain gutter, which is elevated when the cover is raised or closed so as to be positioned under the rear edge of the roof opening and, after lowering, is rearwardly displaceable together with the cover.

In a known sliding lifting roof of this kind, German Offenlegungsschrift No. 32 18 209, corresponding to U.S. Pat. No. 4,537,442, the problem exists that water, accumulated on the roof after a rainfall or after passage through a car wash facility, or the like, at least in part may reach the interior of the vehicle when the brakes are applied with the cover in its tilted position.

It is the primary object of the present invention to refine the design of the noted type of sliding and lifting roof in such a way as to effectively prevent water accumulated on the roof surface from entering the vehicle interior when the cover is tilted.

This objective is achieved, in accordance with a preferred embodiment, by having the rain gutter of the invention connected with a tilting device which, when the cover of the rain gutter is raised, causes it to assume a slanted position such that the forward edge of the rain gutter forms a splashboard which projects upwardly above the rear edge of the roof opening.

In accordance with the invention, because the tilting action of the rain gutter causes the front edge of the gutter to be elevated, when the cover is raised to a position in which at least a portion of it is positioned above the rear edge of the roof opening, if the vehicle is braked, water which has accumulated behind the roof opening on the fixed roof surface will hit the front edge of the rain gutter, which acts as a splashboard, and is then drained off by the rain gutter in a known manner.

In an advantageous embodiment of the invention, the tilting device connected with the rain gutter may have control levers at both sides of the roof opening that are fixedly connected with the rain gutter in the area of their rear ends, and pivotally connected to the cover in the area of their forward ends, at a point which is closer to the rear edge of the cover than its forward edge. The degree to which the forward edge of the gutter is elevated when the cover is raised can easily and appropriately be predetermined by the position of the pivotal connection of the control levers to the cover. Thus, the closer the pivot point is to the rear edge of the cover, the more pronounced the tilting of the rain gutter will be and, in turn, the higher the forward edge of the rain gutter will be positioned when the cover is tilted.

If, in a manner also known from U.S. Pat. No. 4,537,442, the rain gutter, for purposes of vertical adjustment, is supported on inclined planar cam surfaces by cam followers that are fixedly connected with the rain gutter, then the cam followers, advantageously, may simultaneously be disposed so that they form pivot bearings for the tilting movement of the rain gutter, when the cover is raised.

In a further developement of the invention, at least the upper segment of the forward edge of the rain gutter consists of a flexible splashboard strip, which, even in a position corresponding to the closed cover position of the gutter, attempts to project upwardly above the rear edge of the roof opening, and which can be resiliently deflected by the closed cover. As a consequence, the effective height of the splashboard can be increased when the cover is raised.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
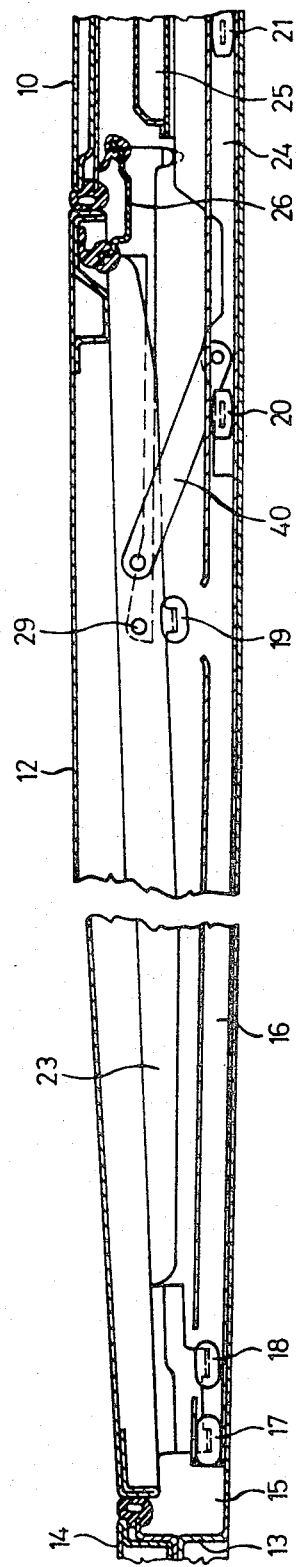
FIG. 1 is a schematic view of a longitudinal section through a sliding and lifting roof, according to the invention, with the cover in a closed position.
Figure 2:
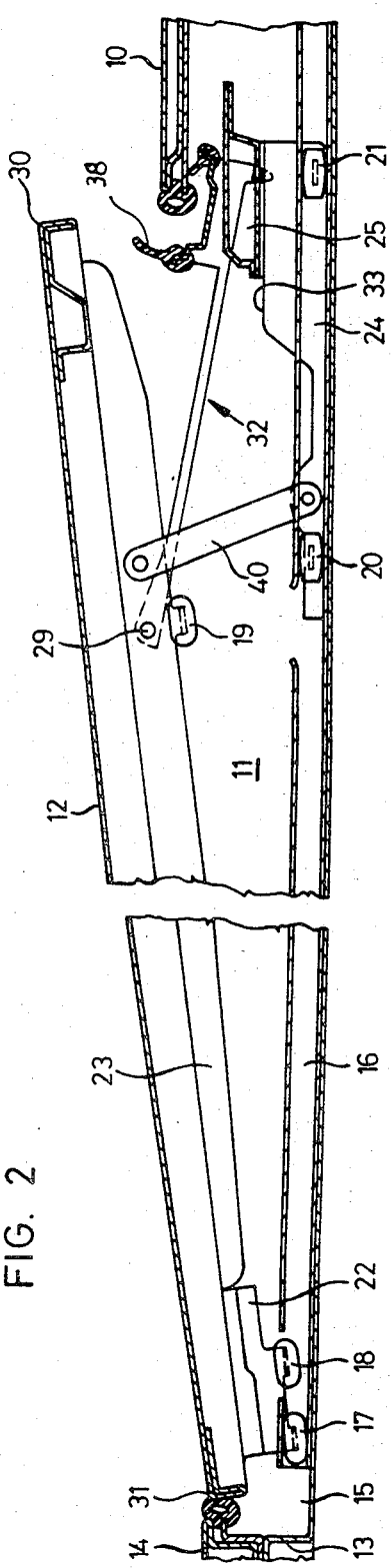
FIG. 2 is a section corresponding to that of FIG. 1, but with the cover in a upwardly tilted raised position.

As can be seen from FIGS. 1 and 2 particularly, a roof opening 11 is provided in fixed roof surface 10, which may be closed by a rigid cover 12 or, alternatively, can be at least partly opened. Roof opening 11 is encircled by a roof frame 13, which forms a rain gutter 15 along a forward edge 14 and at both sides of the roof opening. Guide rails 16 are mounted at roof frame 13, and extend along each side of roof opening 11 in the longitudinal direction of the vehicle. Guide rails 16 and the other elements of the sliding and lifting roof essentially have mirror image symmetry relative to a central longitudinal plane and, consequently, the following text only details the construction and function of the assembly on one side, it being understood that the details of the opposite side are identical.

Slide shoes 17, 18, 19, 20 and 21 travel in guide rail 16. Slide shoes 17 and 18 are secured at a slide shoe carrier 22, which on its part is connected to a support 23, which is affixed to cover 12, for instance, by being bolted to the cover. Slide shoes 20 and 21 are disposed on a guide element 24 which is connected with a transport bridge 25 extends transversely to the longitudinal direction of the vehicle. Transport bridge 25 is displaceable, in any known, manner, in the longitudinal direction of the vehicle. For example, a pressure resistant threaded cable can engage transport bridge 25, the cable being driven by a motor drive or hand crank, also, in any known manner.

A vertically tiltable rear rain gutter 26 underlies rear edge 27 of roof opening 11, when the cover is closed (FIG. 1) and when the cover 12 is tilted (FIG. 2). The rain gutter 26 is connected with a tilting mechanism designated generally as 32. Control levers 28 (only one of which is shown) have rearwardly disposed ends fixedly connected to respective sides of rain gutter 26, and constitute part of tilting assembly 32. Control levers 28, in the area of their forwardly disposed ends are connected with support 23, via connecting bolts 29. Connecting bolts 29 are positioned closer to the rear edge 30 of cover 12 than they are to its forward edge 31 (i.e., they are located less than half the length of cover 12 from its rear edge 30). Additionally, the guide element 24 forms a cam portion 33, having an inclined surface 34.

The rear rain gutter 26 is supported on cam portion 33 by a cam follower 35 that is fixedly connected with rain gutter 26. Cam follower 35, at the same time, functions as a pivot support for the tilting of rain gutter 26 as the cover 12 is shifted from its closed position to its upwardly tilted position (FIG. 2). The forward edge 37 of rain gutter 26 is, in part, comprised of a flexible splashboard strip 38, while rain gutter 26 has a flexible seal 39 at its rear edge. Guide element 24 and support 23 of cover 12 are connected by a raising mechanism, not depicted in detail, whereof a lifting lever is indicated by reference numeral 40. Such a raising mechanism, for instance, may be of the kind described in German Offenlegungsschrift No. 32 38 454 corresponding to U.S. patent application Ser. No. 530,716, filed Sept. 9, 1983, now U.S. Pat. No. 4,566,730.

Figure 3:
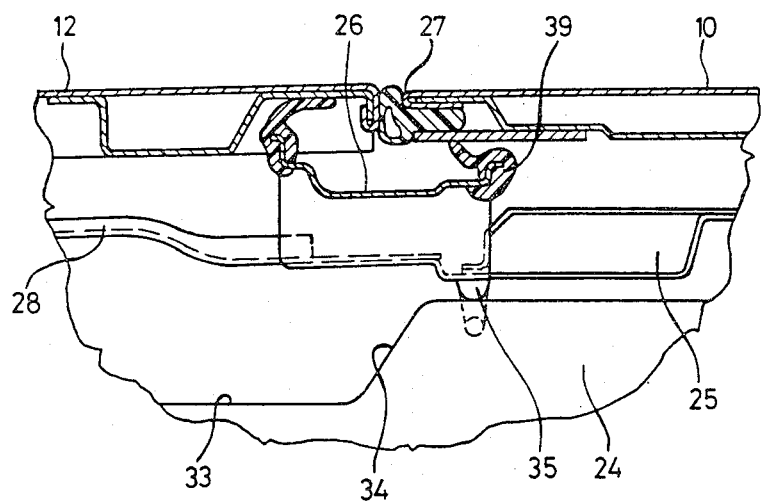
FIGS. 3, 4 and 5 are partial sectional views, on an enlarged scale, showing the cover in a closed position, with its rear edge lowered, and with its rear edge raised above the fixed roof surface, respectively.

In the closed position of cover 12, cam follower 35 is seated on an upper surface 41 of cam portion 33 which extends, essentially, in a horizontal direction (FIGS. 1 and 3). Rear rain gutter 26 is pivoted about connecting bolt 29 so as to assume a lifted position in which splashboard strip 38 and seal 39 are compressed upwardly against cover 12 or rear edge 27 or roof opening 1, respectively. Rain gutter 26 thereby underlies the junction between rear edge 30 of cover 12 and a seal 42 that encircles the perimeter of roof opening 11.

When transport bridge 25, and with it guide element 24, are moved forward from the closed cover position of FIGS. 1 and 3, the raising mechanism with lifting lever 40 produces pivoting of cover 12 about a pivot axis determined by front slide shoe 17. As a consequence, rear edge 30 of cover 12 and connecting bolt 29 are displaced upwardly, opening a venting slot 43 in the rear edge area of roof opening 11. Simultaneously, control levers 28 induce rear rain gutter 26 into a tilting movement about an axis determined by the cam follower 35 by exerting a lifting force at the front of rain gutter 26 to project upwardly above rear edge 27 of roof opening 11 so that it thereby forms a spashboard, and any water accumulated on fixed roof surface 10, behind roof opening 11, hits this splashboard when there is braking of the vehicle with the cover in a tilted position. In this manner, water is prevented from entering the interior of the vehicle and is drained off by rain gutter 26 in a known manner.

Figure 4:
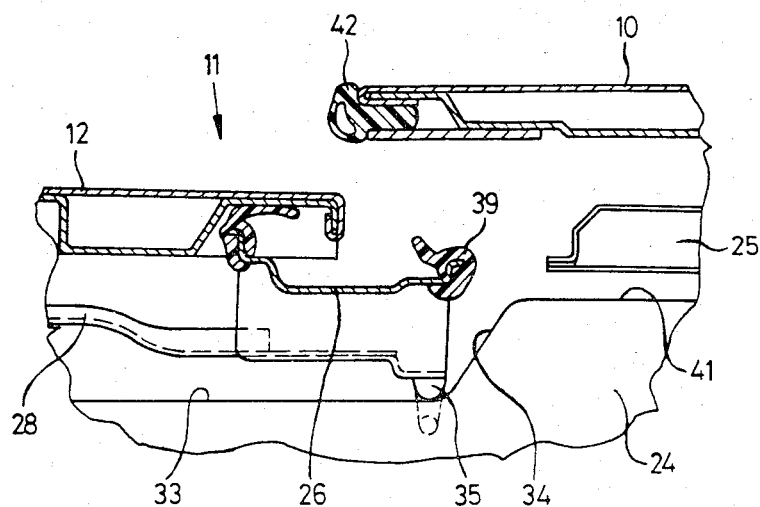
Figure 5:
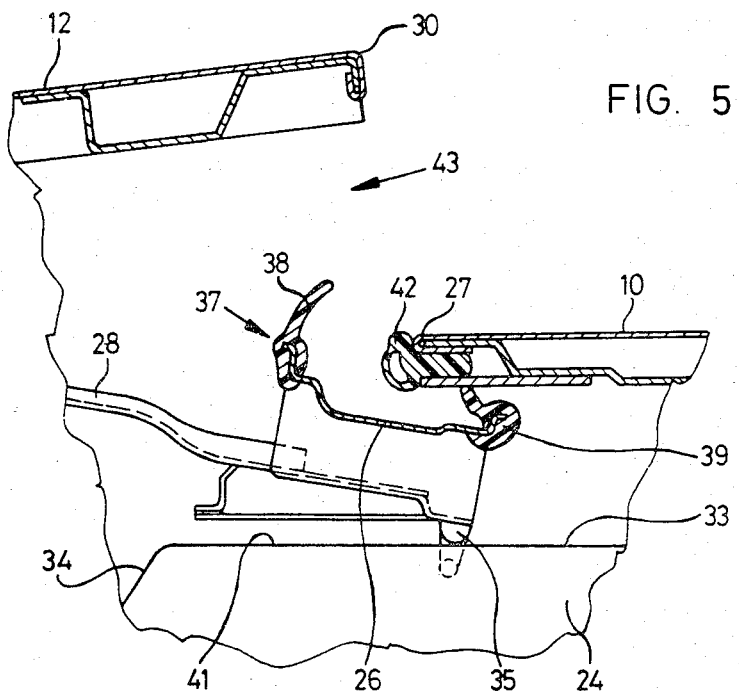

If transport bridge 25, starting from the lifted position according to FIGS. 2 and 5, is moved rearwardly, such action causes cover 12 to be returned to its closed position (FIG. 1) which, as can be seen from FIGS. 1 and 3, results in the upper portion of splashboard strip 38 being turned under. The length of splashboard strip 38 is such that, in the absence of cover 12, the splashboard strip of rain gutter 26, would project above rear edge 27 of roof opening 11, even while in a position corresponding to that of the closed cover position of FIGS. 1 and 3. If transport bridge 25 is subsequently moved further to the rear, rear edge 30 of cover 12 is lowered below the plane of fixed roof surface 10 by the raising mechanism (in the above-noted known manner, that involves a longitudinal lost motion shifting of bridge 25 and its guide element 24 relative to cover 12). Cam follower 35 simultaneously slides downwardly along inclined surface 34. This causes rain gutter 26 to be pivoted into a lowered position as depicted in FIG. 4. Further displacement of transport bridge 25 to the rear facilitates that rain gutter 26 can now be moved together with cover 12 below the portion of fixed roof surface 10 that is rearwardly adjacent to rear edge 27 of roof opening 11.

It should be understood that the foregoing describes only one embodiment and that the disclosure is not limited thereto, but rather, the invention being intended to cover all changes and modifications of the invention encompasses by the scope of appended claims. For example, rain gutter 26 can be supported on cam portion 33 by way of two or more cam followers arranged in series in the direction of cover displacement, in which arrangement the rearwardmost cam follower may serve as the pivot support for the tilting movement of the rain gutter. Another possible variation would be to have the rain gutter pivot support or supports designed to that they are independent from the cam arrangement which facilitates the vertical adjustment of the rain gutter; for example, whereby rain gutter 26, at, or near its longitudinal center, at its underside, is provided with a cam or the like, which, when the rain gutter is in a tilted position, is mounted on a counter support that could be positioned at transport bridge 25. Similarly, other modifications will be apparent to those of ordinary skill in the art.

We claim:

1. In a sliding and lifting roof for vehicles of the type having a rigid cover for closing a roof opening in a fixed roof surface in a closed position thereof, said cover being mounted on guide rails in a manner enabling the cover to be displaced from said closed position by being selectively tiltable so as to raise a rear edge of the cover above the fixed roof surface, and rearwardly slidable after lowering of its rear edge below the fixed roof surface, and an adjustable rain gutter which is positioned underlying a rear edge of the roof opening when the cover is in tilted and closed positions, and which is rearwardly displaceable together with the cover after being lowered from its position underlying the rear edge of the roof opening, the improvement wherein said rain gutter is connected tith a tilting device, said tilting device being operable for causing a bottom wall of the rain gutter to assume an inclined position in which a front side of the rain gutter is raised above a rear side thereof and wherein a forward edge of the rain gutter forms a splashboard which projects upwardly above the rear edge of roof opening, when said cover is tilted.

2. Sliding and lifting roof according to claim 1, wherein the tilting device has a control lever at each side of the roof opening, each control lever being fixedly connected, in an area of a rear end thereof, with the rain gutter and a forward end thereof being pivotally interconnected with the cover at a point which is closer to the rear edge of the cover than a forward edge thereof.

3. Sliding and lifting roof according to claim 2, wherein the rain gutter, for purposes of vertical adjustment, co-acts with inclined cam surfaces by way of cam follower means fixedly connected with the rain gutter, said cam follower means also forming means for pivotally supporting the rain gutter when the cover is tilted.

4. Sliding and lifting roof according to claim 1, wherein the rain gutter, for purposes of vertical adjustment, co-acts with inclined cam surfaces by way of cam follower means fixedly connected with the rain gutter, said cam follower means also forming means for pivotally supporting the rain gutter when the cover is tilted.

5. Sliding and lifting roof according to claim 4, wherein at least an upper portion of a forward edge of the rain gutter comprises a flexible splashboard strip which has a height sufficient that, in a position of the rain gutter occurring when the cover is in said closed position, said splashboard strip is resiliently deflected by the cover.

6. Sliding and lifting roof according to claim 1, wherin at least an upper portion of a forward edge of the rain gutter comprises a flexible splashboard strip which has a height sufficient that, in a position of the rain gutter occurring when the cover is in said closed position, said splashboard strip is resiliently deflected by the cover.

7. Sliding and lifting roof according to claim 2, wherein at least an upper portion of a forward edge of the rain gutter comprises a flexible splashboard strip which has a height sufficient that, in a position of the rain gutter occurring when the cover is in said closed position, said splashboard strip is resiliently deflected by the cover.

8. Sliding and lifting roof according to claim 3, wherein at least an upper portion of a forward edge of the rain gutter comprises a flexible splashboard strip which has a height sufficient that, in a position of the rain gutter occurring when the cover is in said closed position, said splashboard strip is resiliently deflected by the cover.

* * * * *